US011271711B2

(12) United States Patent
Masuda

(10) Patent No.: US 11,271,711 B2
(45) Date of Patent: Mar. 8, 2022

(54) COMMUNICATION CONTROL DEVICE, COMMUNICATION CONTROL METHOD, NETWORK SWITCH, ROUTE CONTROL METHOD, AND COMMUNICATION SYSTEM

(71) Applicant: SONY CORPORATION, Tokyo (JP)

(72) Inventor: Yasuto Masuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 16/663,885

(22) Filed: Oct. 25, 2019

(65) Prior Publication Data
US 2020/0059347 A1  Feb. 20, 2020

Related U.S. Application Data

(62) Division of application No. 15/735,420, filed as application No. PCT/JP2016/063855 on May 10, 2016, now Pat. No. 10,491,366.

(30) Foreign Application Priority Data

Jun. 22, 2015  (JP) ................. 2015-124596

(51) Int. Cl.
*H04L 7/00* (2006.01)
*H04N 21/2343* (2011.01)
(Continued)

(52) U.S. Cl.
CPC .......... *H04L 7/0033* (2013.01); *H04J 3/0658* (2013.01); *H04L 67/1095* (2013.01);
(Continued)

(58) Field of Classification Search
CPC ................ H04L 7/00; H04L 7/0016; H04L 7/0033–0041; H04L 67/1095;
(Continued)

(56) References Cited

U.S. PATENT DOCUMENTS 6,253,375 B1 * 6/2001 Gordon .............. H04N 7/17336
  348/E7.073
7,499,500 B2 * 3/2009 Page ........................ H04J 3/00
  375/295

(Continued)

FOREIGN PATENT DOCUMENTS

JP  2001-527708 A  12/2001
JP  2011-135134 A  7/2011

(Continued)

OTHER PUBLICATIONS

Non-Final Office Action for U.S. Appl. No. 15/735,420, dated Jan. 31, 2019, 12 pages.

(Continued)

*Primary Examiner* — James M Perez
(74) *Attorney, Agent, or Firm* — Chip Law Group

(57) ABSTRACT

A communication control device that includes a synchronization detection unit that detects a synchronization timing from a synchronization signal and a transmission control unit that causes a communication unit to transmit a control signal., for changing a communication route of data to which a flag specified on the basis of the synchronization signal, to a network switch that performs relay between a reception device and a plurality of transmission devices that transmits the data to which the flag is added while changing the flag at the synchronization timing.

17 Claims, 11 Drawing Sheets

(51) Int. Cl.
*H04N 21/242* (2011.01)
*H04N 21/6338* (2011.01)
*H04L 67/1095* (2022.01)
*H04L 69/28* (2022.01)
*H04J 3/06* (2006.01)

(52) U.S. Cl.
CPC ......... *H04L 69/28* (2013.01); *H04N 21/2343* (2013.01); *H04N 21/242* (2013.01); *H04N 21/6338* (2013.01); *H04J 3/0667* (2013.01)

(58) Field of Classification Search
CPC ....... H04L 69/28; H04J 3/0658; H04J 3/0667; H04N 21/2343; H04N 21/242; H04N 21/6338
See application file for complete search history.

(56) References Cited

U.S. PATENT DOCUMENTS

| | | | | |
|---|---|---|---|---|
| 7,542,485 | B2* | 6/2009 | Bingham | G06F 1/14 370/507 |
| 7,657,918 | B2* | 2/2010 | Gordon | H04N 7/17336 725/126 |
| 8,920,244 | B2* | 12/2014 | Koyama | A63F 13/35 463/43 |
| 10,135,891 | B2* | 11/2018 | Chen | H04L 65/4076 |
| 10,491,366 | B2* | 11/2019 | Masuda | H04J 3/0658 |
| 10,645,131 | B2* | 5/2020 | Chen | H04N 21/6405 |
| 10,849,048 | B2* | 11/2020 | Hashemi | H04W 40/246 |
| 10,944,818 | B1* | 3/2021 | Izenberg | H04L 43/067 |
| 2001/0038628 | A1* | 11/2001 | Ofek | H04J 3/0697 370/392 |
| 2002/0080828 | A1* | 6/2002 | Ofek | H04L 47/10 370/539 |
| 2004/0090970 | A1* | 5/2004 | Sanchez | H04L 45/00 370/397 |
| 2005/0135429 | A1* | 6/2005 | Bingham | H04L 67/1095 370/503 |
| 2009/0240790 | A1* | 9/2009 | Utsunomiya | H04L 12/4645 709/221 |
| 2009/0244303 | A1* | 10/2009 | Kinoshita | H04N 5/343 348/218.1 |
| 2010/0095322 | A1* | 4/2010 | Gordon | H04N 7/17336 725/30 |
| 2010/0118788 | A1* | 5/2010 | Ohta | H04W 74/08 370/328 |
| 2011/0072454 | A1* | 3/2011 | Gordon | H04N 7/17336 725/28 |
| 2012/0198506 | A1* | 8/2012 | Joe | H04N 21/6371 725/97 |
| 2013/0079156 | A1* | 3/2013 | Koyama | A63F 9/24 463/43 |
| 2015/0127772 | A1* | 5/2015 | Masuda | H04L 65/1083 709/217 |
| 2016/0352613 | A1* | 12/2016 | Narayanan | H04L 45/021 |
| 2017/0279709 | A1* | 9/2017 | Bonica | H04L 45/50 |
| 2018/0176001 | A1* | 6/2018 | Masuda | H04L 67/1095 |
| 2020/0059347 | A1* | 2/2020 | Masuda | H04L 69/28 |
| 2020/0221367 | A1* | 7/2020 | Hashemi | H04W 40/246 |

FOREIGN PATENT DOCUMENTS

| | | |
|---|---|---|
| JP | 2015-091093 A | 5/2015 |
| WO | 98/031115 A2 | 7/1998 |
| WO | 2015/008023 A1 | 1/2015 |

OTHER PUBLICATIONS

Notice of Allowance for U.S. Appl. No. 15/735,420, dated Jul. 30, 2019, 08 pages.

International Search Report and Written Opinion of PCT Application No. PCT/JP2016/063855, dated Jul. 5, 2016, 06 pages of English Translation and 06 pages of ISRWO.

International Preliminary Report on Patentability of PCT Application No. PCT/JP2016/063855, dated Jan. 4, 2018, 06 pages of English Translation and 03 pages of IPRP.

* cited by examiner

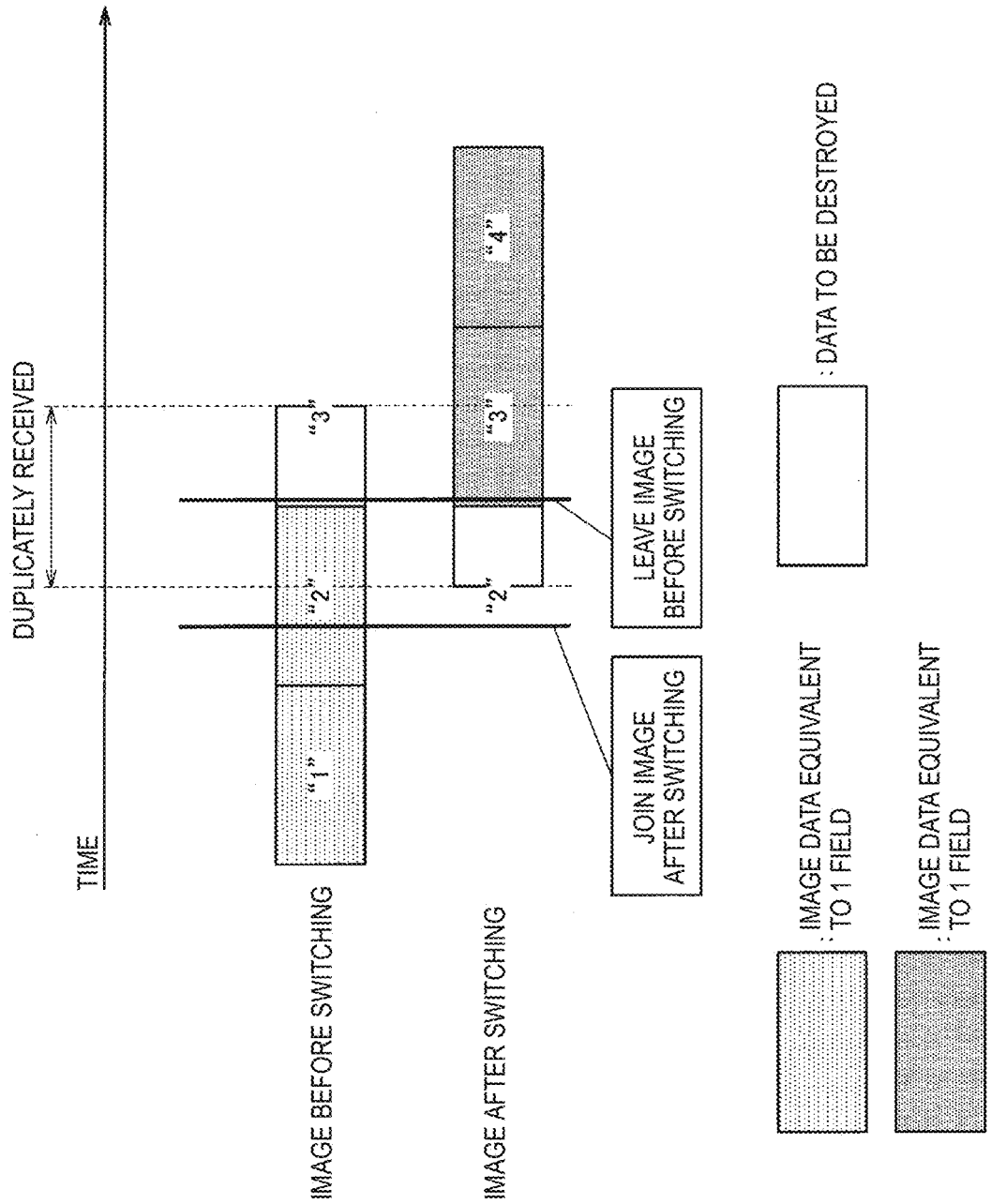

FIG. 6
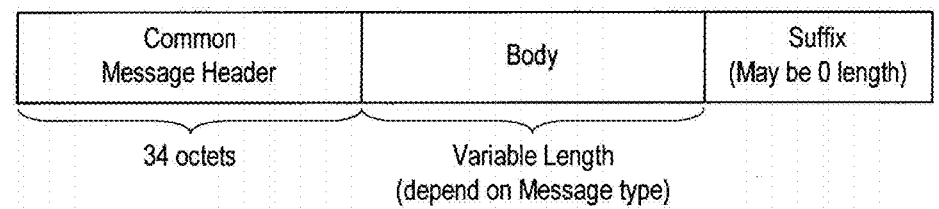
FIG. 7
| Bits | | | | | | | | Octets | Offset |
|---|---|---|---|---|---|---|---|---|---|
| 7 | 6 | 5 | 4 | 3 | 2 | 1 | 0 | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flagField | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequenceID | | | | | | | | 2 | 30 |
| controlField | | | | | | | | 1 | 32 |
| logMessageInterval | | | | | | | | 1 | 33 |
FIG. 8
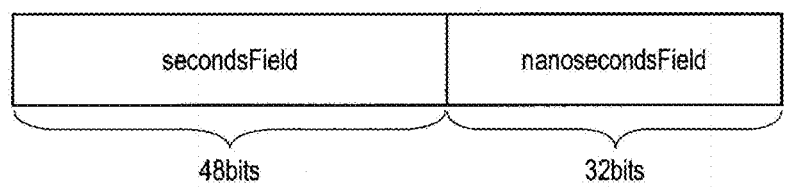

FIG. 13
| TRANSMISSION SOURCE | FLAG | TRANSFER DESTINATION |
|---|---|---|
| 300A | 0 | 400 |
| 300A | 1 | 400 |
| 300B | 0 | NONE |
| 300B | 1 | NONE |
T0
| TRANSMISSION SOURCE | FLAG | TRANSFER DESTINATION |
|---|---|---|
| 300A | 0 | NONE |
| 300A | 1 | 400 |
| 300B | 0 | 400 |
| 300B | 1 | NONE |
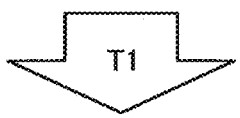
T1
| TRANSMISSION SOURCE | FLAG | TRANSFER DESTINATION |
|---|---|---|
| 300A | 0 | NONE |
| 300A | 1 | NONE |
| 300B | 0 | 400 |
| 300B | 1 | 400 |

COMMUNICATION CONTROL DEVICE, COMMUNICATION CONTROL METHOD, NETWORK SWITCH, ROUTE CONTROL METHOD, AND COMMUNICATION SYSTEM

This application is divisional application of U.S. patent application Ser. No. 15/735,420, filed on Dec. 11, 2017, which is a U.S. National Phase of International Patent Application No. PCT/JP2016/063855 filed on May 10, 2016, which claims priority benefit of Japanese Patent Application No. 2015-124596 filed in the Japan Patent Office on Jun. 22, 2015. Each of the above-referenced applications is hereby incorporated herein by reference in its entirety.

TECHNICAL FIELD

The present disclosure relates to a communication control device, a communication control method, a network switch, a route control method, and a communication system.

BACKGROUND ART

In recent years, technologies for transmitting data such as images (still images or moving images) using the Internet protocol (IP) have been widely used. In addition, to perform large-scale delivery, technologies for transmitting images by IP multicast (hereinafter also simply referred to as "multicast") have been developed.

For example, Patent Literature 1 discloses a technology for suppressing bandwidth consumption at the time of switching images transmitted by multicast.

CITATION LIST

Patent Literature

Patent Literature 1: JP 2011-135134A

DISCLOSURE OF INVENTION

Technical Problem

For example, a device using the technology disclosed in Patent Literature 1 receives an image stream hierarchically encoded in a plurality of layers, receives only a basic hierarchy stream among the hierarchies of the image stream immediately after channel switching, and subsequently receives an extended hierarchy stream. Accordingly, for example, by using the technology disclosed in Patent Literature 1, there is a possibility of an increase in a reception bandwidth immediately after channel switch being suppressed.

However, for example, in a case in which the technology disclosed in Patent Literature 1, there is a concern of bandwidth consumption at the time of switching data to be transmitted not being sufficiently suppressed due to overlapping of bandwidths equivalent to the basic hierarchy.

Accordingly, the present disclosure proposes a novel and improved communication control device, a novel and improved communication control method, a novel and improved network switch, a novel and improved route control method, and a novel and improved communication system capable of suppressing bandwidth consumption at the time of switching data to be transmitted.

Solution to Problem

According to the present disclosure, there is provided a communication control device including: a synchronization detection unit configured to detect a synchronization timing from a synchronization signal; and a transmission control unit configured to cause a communication unit to transmit a control signal for changing a communication route of data to which a flag specified on the basis of the synchronization signal is added, to a network switch performing relay between a reception device and a plurality of transmission devices transmitting the data to which the flag is added while changing the flag at the synchronization timing, at a timing corresponding to the synchronization timing.

In addition, according to the present disclosure, there is provided a communication control method including: detecting a synchronization timing from a synchronization signal; and causing a processor to transmit a control signal for changing a communication route of data to which a flag specified on the basis of the synchronization signal is added, to a network switch performing relay between a reception device and a plurality of transmission devices transmitting the data to which the flag is added while changing the flag at the synchronization timing on the basis of the control signal, at a timing corresponding to the synchronization timing.

In addition, according to the present disclosure, there is provided a network switch including: a reception unit configured to receive a control signal for changing a communication route of data to which a flag specified on the basis of a synchronization signal is added and which is transmitted at a timing corresponding to a synchronization timing detected from the synchronization signal; and a route control unit configured to control relay between a reception device and a plurality of transmission devices transmitting the data to which the flag is added while changing the flag at the synchronization timing.

In addition, according to the present disclosure, there is provided a route control method including: receiving a control signal for changing a communication route of data to which a flag specified on the basis of a synchronization signal is added and which is transmitted at a timing corresponding to a synchronization timing detected from the synchronization signal; and performing, by a processor, on the basis of the control signal, relay between a reception device and a plurality of transmission devices transmitting the data to which the flag is added while changing the flag at the synchronization timing.

In addition, according to the present disclosure, there is provided a communication system including: a plurality of transmission devices configured to transmit data to which a flag is added while changing the flag at a synchronization timing detected from a synchronization signal; a network switch configured to include a reception unit configured to receive a control signal, and a route control unit configured to control relay between a reception device and the plurality of transmission devices; and a communication control device configured to include a synchronization detection unit configured to detect the synchronization timing from the synchronization signal, and a transmission control unit configured to cause a communication unit to transmit the control signal for changing a communication route of the data to which the flag specified on the basis of the synchronization signal is added, to the network switch at a timing corresponding to the synchronization timing.

Advantageous Effects of Invention

According to the present disclosure, as described above, it is possible to suppress bandwidth consumption at the time of switching data to be transmitted.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram illustrating an example of an operation of a reception device in the procedure illustrated in FIGS. 2A, 2B and 2C.

FIG. 6 is an explanatory diagram illustrating an example of a synchronization signal transmitted by a synchronization signal generation device according to the embodiment.

FIG. 7 is an explanatory diagram illustrating an example of a synchronization signal transmitted by a synchronization signal generation device according to the embodiment.

FIG. 8 is an explanatory diagram illustrating an example of a synchronization signal transmitted by a synchronization signal generation device according to the embodiment.

FIG. 13 is an explanatory diagram illustrating an example of a communication control process in the communication system according to the embodiment.

MODE(S) FOR CARRYING OUT THE INVENTION

Figure 1:
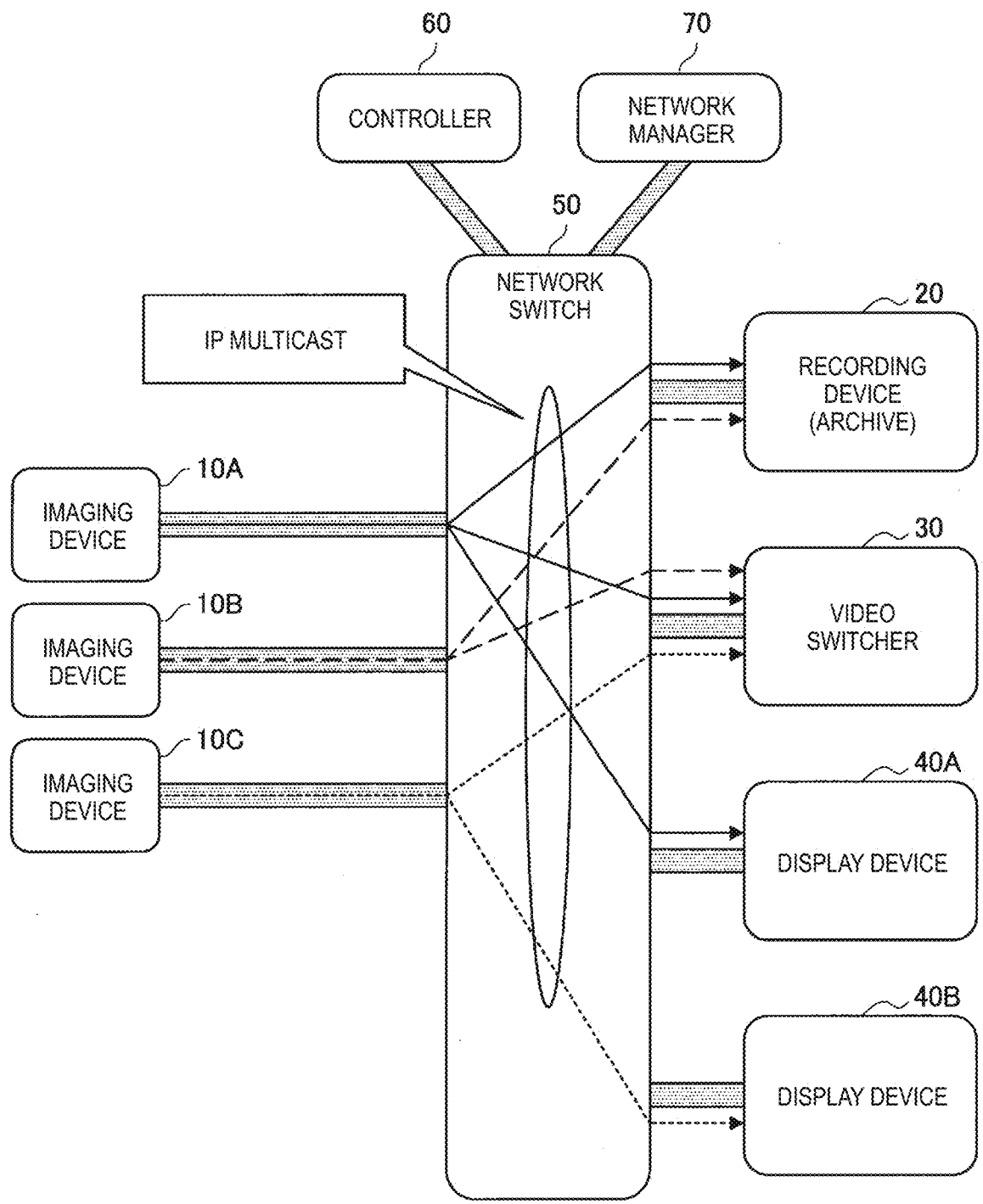
FIG. 1 is an explanatory diagram illustrating an example of a general network configuration in a camera system.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will be made in the following order.
<<1. Background>>
<<2. Configuration>>
<2-1. Configuration of communication system>
<2-2. Configuration of communication control device>
<2-3. Configuration of network switch>
<<3. Operation>>
<<4. Modification examples>>
<4-1. Modification example 1>
<4-2. Modification example 2>
<<5. Example of hardware configuration>>
<<6. Conclusion>>

1. Background

Before a communication system according to an embodiment of the present disclosure is described, a background of creation of the communication system according to the embodiment will be first described.

For example, in a case in which a camera system used in a broadcast station or the like is realized with a best-effort type IP, data ought not to be lost on a network and image quality ought not to be changed either. Here, for example, in a video conference system or the like, a scheme of preventing data loss on a network by dynamically changing an image encoding rate in accordance with the degree of congestion of the network is used. However, in the foregoing camera system, since dynamic change of image quality is not permissible, the foregoing scheme of preventing data loss on a network may not be adopted.

In addition, for example, in a case in which the technology disclosed in Patent Literature 1 is used, as described above, bandwidth consumption at the time of switching data to be transmitted may not be sufficiently suppressed due to overlapping of bandwidths equivalent to a basic hierarchy. Further, for example, in a case in which the technology disclosed in Patent Literature 1 is used, temporary degradation of image quality is not avoidable either.

Accordingly, in a camera system used in a broadcast station or the like, there is a request for a structure that ensures bandwidths necessary for transmission without changing an image transmission rate.

FIG. 1 is an explanatory diagram illustrating an example of a general network configuration in a camera system. The camera system includes, for example, imaging devices 10A, 10B, 10C, a recording device 20, a video switcher 30, display devices 40A and 10B, a network switch 500, a controller 60, and a network manager 70.

Here, in the camera system illustrated in FIG. 1, each of the imaging devices 10A to 10C serves as a transmission device that transmits image data. In addition, in the camera system illustrated in FIG. 1, each of the recording device 20, the video switcher 30, the display device 40A, and the display device 40B serves as a reception device that receives image data. In addition, in the camera system illustrated in FIG. 1, for example, multiple-to-multiple image transmission by IP multicast is realized between the transmission devices and the reception devices via the network switch 50.

In the camera system illustrated in FIG. 1, for example, the reception device such as the video switcher 30, the display device 40A, or the display device 40B is used while switching images to be received. At this time, when a user manipulates the controller 60, a switching request is transmitted from the network manager 70 to the reception device and the reception device transmits various requests to the network switch 50 to switch images.

Figure 2A:
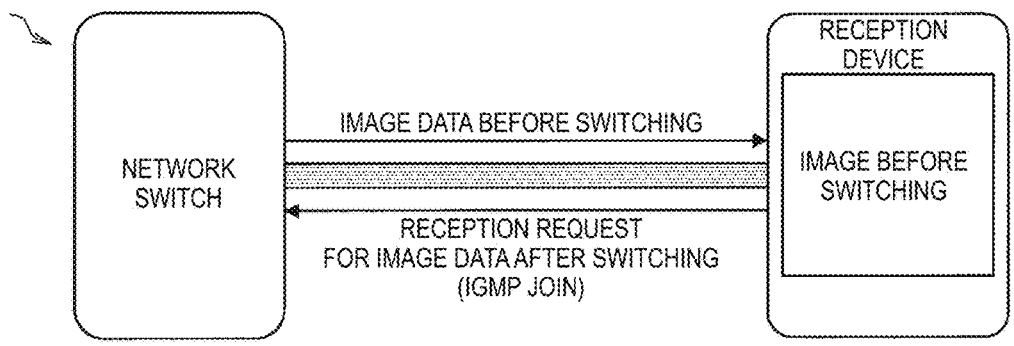
FIGS. 2A, 2B and 2C are explanatory diagram illustrating an example of a procedure in a case in which a stream transmitted by IP multicast is switched.
Figure 2B:
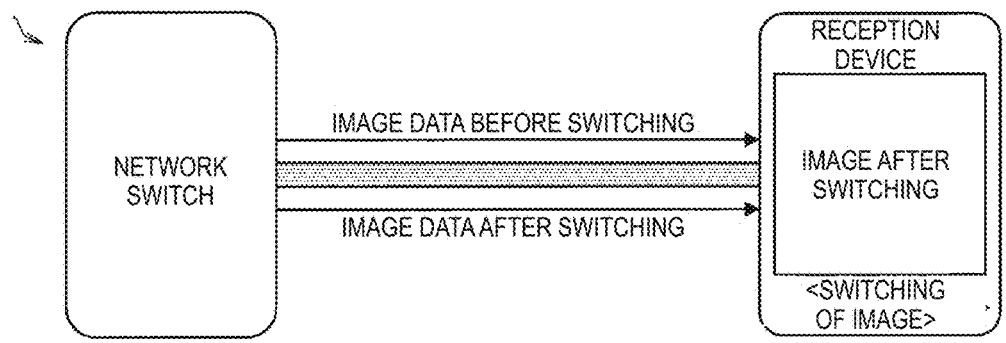
Figure 2C:
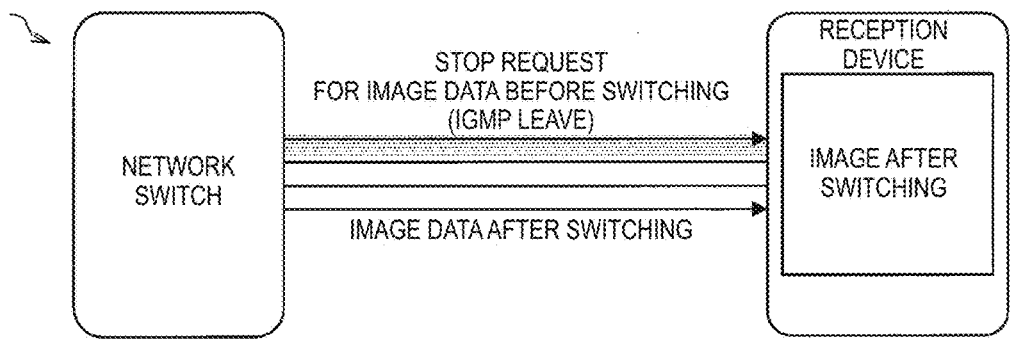

FIGS. 2A, 2B and 2C are explanatory diagram illustrating a procedure in a case in which a stream transmitted by IP multicast is switched. FIGS. 2A, 2B and 2C illustrates an example of a general procedure in a case in which the reception device transmits various requests to the network switch to switch a stream. FIGS. 2A, 2B and 2C indicate a chronological procedure in the order of FIGS. 2A, 2B and 2C.

Here, the stream according to the embodiment refers to, for example, a continuous flow of data transmitted with a specific port number and multicast address.

The reception device transmits a reception request for image data after switching (for example, "Internet Group Management Protocol (IGMP) JOIN"; hereinafter simply referred to as "JOIN" in some cases) to the network switch (FIG. 2A). The network switch having received the reception request starts transmitting image data corresponding to the reception request (image data indicating an image after switching). The transmitted image data is received by the reception device. For example, the reception device switches an image in a subsequent field boundary in the image data from an image before switching to the image after switching (FIG. 2B). Then, the reception device transmits a reception stop request for the image data before switching (for example, "IGMP LEAVE"; hereinafter simply referred to as "LEAVE" in some cases) to the network switch (FIG. 2C). The network switch having received the reception stop request stops transmitting the image data corresponding to the reception stop request (image data indicating an image before switching).

For example, in a case in which the image is switched in the procedure illustrated in FIGS. 2A, 2B and 2C, degradation of image quality does not occur. However, for example, in the case in which the image is switched in the procedure illustrated in FIGS. 2A, 2B and 2C there is a period of time in which the reception device duplicately receives the images before and after switching. Therefore, bandwidths may be consumed double in the period of time.

FIG. 3 is an explanatory diagram illustrating an example of an operation of a reception device in the procedure illustrated in FIGS. 2A, 2B and 2C. FIG. 3 illustrates an example of an operation in a case in which the reception device receives image data transmitted in units of fields.

When the reception device transmits a reception request for image data after switching at a reception timing of Field 2, the reception device receives the image data after switching from a midway portion of Field 2 of an image after switching. Then, for example, the reception device displays the image after switching from Field 3 which is a subsequent field boundary and transmits a reception stop request for the image data before switching. A portion in which the transmission of the image data before switching is actually stopped in the network switch after the transmission of the reception stop request is, for example, a midway portion of Field 4.

A timing at which the transmission of the image data after switching starts or the transmission of the image data before switching stops may not be controlled in the reception device. Therefore, for example, as illustrated in FIG. 3, the reception device has no choice but to duplicately receive the images before and after switching.

Accordingly, for example, it is difficult to suppress bandwidth consumption at the time of switching image data to be transmitted in the procedure in which a stream transmitted by IP multicast is switched, as illustrated in FIGS. 2A, 2B and 2C and FIG. 3.

Accordingly, the embodiment was created in view of the foregoing circumstances. According to the embodiment, it is possible to suppress bandwidth consumption at the time of switching an image to be transmitted. Hereinafter, a configuration and an operation of a communication system according to the embodiment that have the advantages will be described in order.

2. Configuration

The background of the creation of the communication system according to the embodiment has been described above. Next, the configuration of the communication system according to the embodiment will be described. Hereinafter, a case in which the communication system according to the embodiment is applied to a camera system used in a broadcast system or the like will be mainly described as an example, but an application example of the communication system according to the embodiment is not limited to the camera system used in a broadcast station or the like. For example, the communication system according to the embodiment can be applied to any system in which data can be multicast or unicast from one or two or more transmission side devices and a reception side device can switch and receive the data.

2-1. Configuration of Communication System

Figure 4:
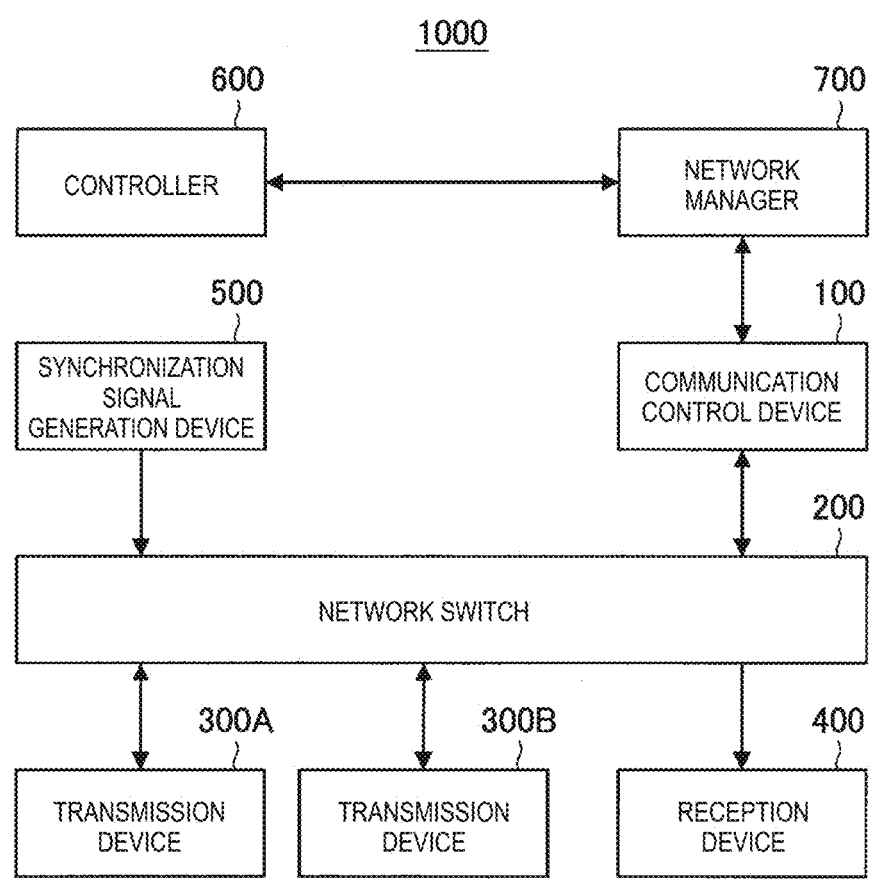
FIG. 4 is an explanatory diagram illustrating an example of a configuration of a communication system according to the embodiment.

FIG. 4 is an explanatory diagram illustrating an example of a configuration of a communication system according to the embodiment. As illustrated in FIG. 4, a communication system 1000 according to the embodiment includes, for example, a communication control device 100, a network switch 200, transmission devices 300A and 300B, a reception device 400, a synchronization signal generation device 500, a controller 600, and a network manager 700. In transmission by the communication system 1000 according to the embodiment, data to be transmitted is an IP packet and a packet transfer destination is decided in accordance with a software defined networking (SDN) protocol such as OpenFlow.

Also, the configuration of the communication system according to the embodiment is not limited to the example illustrated in FIG. 4. For example, the communication control device 100 and the synchronization signal generation device 500 illustrated in FIG. 4 may be an integrated device. That is, the communication control device according to the embodiment can also have a function of the synchronization signal generation device.

(Communication Control Device)

The communication control device 100 is an information processing device that receives an image switching request from the network manager 700 to be described below, converts the switching request into a control signal for changing a communication route, and transmits the control signal to the network switch 200 to be described below. In addition, the communication control device 100 according to the embodiment receives a synchronization signal from the synchronization signal generation device 500 to be described below and transmits the control signal at a timing in accordance with a synchronization timing detected from the synchronization signal. In addition, the control signal transmitted by the communication control device 100 according to the embodiment includes information regarding a flag to be described below, which is specified on the basis of the synchronization signal. The detailed configuration of the communication control device 100 will be described below with reference to FIG. 9.

(Network Switch)

The network switch 200 is configured with, for example, a switching element or a processing circuit that realizes a function of exchanging a line or a packet and performs exchanging (switching) of a line or a packet. For example, the network switch 200 according to the embodiment performs relay between the transmission devices 300A and 300B and the reception device 400 to be described below.

Here, the network switch 200 according to the embodiment controls a communication route or the like in a unit referred to as a flow, for example. The flow according to the embodiment may be, for example, a set including a condition, an action, and statistical information. The condition in the flow is a condition for identifying packets received by the network switch 200 and may be, for example, information regarding a transmission source (a MAC address, an IP address, or the like), information regarding a flag to be described below, and a combination thereof. The action is information for designating a process for a packet matching the condition and may be, for example, a route control process such as a process of transferring the packet to a designated transfer destination or not transferring (destroying) the packet to any destination. In addition, the statistical information may include, for example, the number of communications matching the condition or the number of times the action is performed.

The network switch according to the embodiment may perform control such as communication route change by receiving a control signal which is a flow control request for controlling the flow from the communication control device 100 and performing flow control in accordance with the control signal. The detailed configuration of the network switch 200 will be described below with reference to FIG. 10.

(Transmission Device)

The transmission devices 300A and 300B are devices that transmit image data to the network switch 200. For example, the transmission devices 300A and 300B may be imaging devices such as the imaging devices 10A to 10C described with reference to FIG. 1. In addition, the transmission devices 300A and 300B may be, for example, devices that read and transmit image data from storage units (not illustrated) which are inside or outside of the transmission devices. The image data transmitted by the transmission devices 300A and 300B may be received by the reception device 400 via the network switch 200.

In addition, the transmission devices 300A and 300B according to the embodiment add flags to image data and transmit the image data to which the flags are added. For example, the transmission devices 300A and 300B may transmit the image data to which the flags are added while changing the flags at synchronization timings detected from the synchronization signals received from the synchronization signal generation device 500 to be described below. For example, the synchronization timings may be synchronized in predetermined units in regard to the image data transmitted by the transmission devices 300A and 300B. Examples of the predetermined units in regard to the image data according to the embodiment include units of fields and units of frames. In addition, the predetermined units in regard to the image data according to the embodiment may be units of a plurality of fields or units of a plurality of frames. Hereinafter, a case in which the predetermined units in regard to the image data according to the embodiment are units of one field will mainly be described as an example. In addition, since the flag in the example is designated for each field, the flag is also referred to as a field designation flag.

Also, since both the transmission devices 300A and 300B receive the synchronization signals from the synchronization signal generation device 500 and changes the flags at the synchronization timings detected from the synchronization signals, change timings of the flags are synchronized between the transmission devices 300A and 300B. In addition, for example, by setting an order of values of the added flags or values added at initial synchronization timings to be the same in advance, the values of the flags added to images by the transmission devices 300A and 300B are also synchronized. For example, values 0 and 1 of the flags may be alternately repeated and the transmission devices 300A and 300B may add the flags of the value 0 to the image data at an initial synchronization timing. In addition, as will be described below, in a case in which the synchronization signal includes a time stamp, the transmission devices 300A and 300B may specify flags to be added to the image data in accordance with the time stamp.

Figure 5:
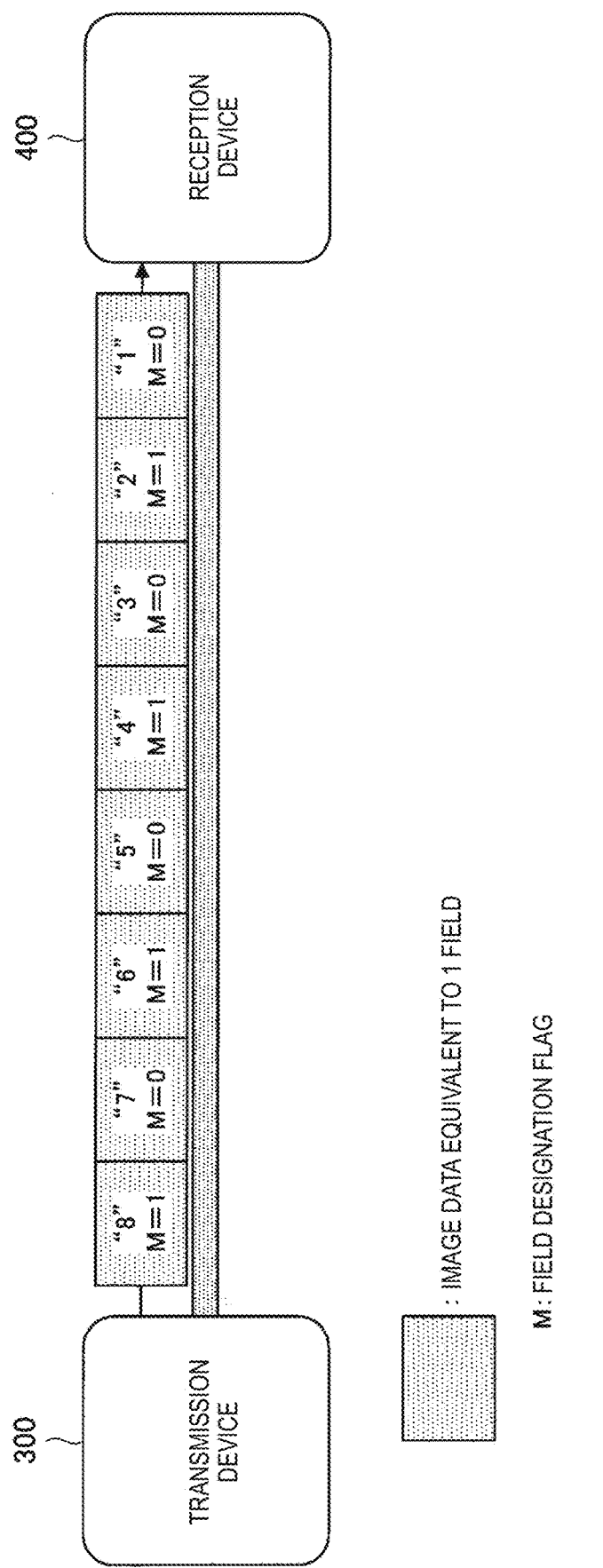
FIG. 5 is an explanatory diagram illustrating an example of transmission of image data performed in the communication system according to the embodiment.

FIG. 5 is an explanatory diagram illustrating an example of transmission of image data performed in the communication system 1000 according to the embodiment. As illustrated in FIG. 5, each transmission device 300 (the transmission devices 300A and 300B) according to the embodiment transmits image data to which a flag different from the flag added to the recently transmitted image data is added in one stream for each predetermined unit in the image data. For example, as illustrated in FIG. 5, values 0 and 1 of a flag (field designation flag) M added to the transmitted image data (stream) may be alternately repeated for each field. Also, the flag may be referred to in the route control process by the network switch 200 and may be neglected in the reception device 400. In addition, for example, a marker bit in the real-time transport protocol (RTP) or a source port number in the user datagram protocol (UDP) may be used as the flag.

As described above, the synchronization timings are synchronized in predetermined units in regard to the image data (the flag M is switched for each predetermined unit). Thus, the network switch 200 can perform changing of a communication route (switching of an image) for each predetermined unit in regard to the image data. For example, in a case in which the predetermined units are units of one field, as described above, the image is switched in units of one field without switching an image in the midway portion of one field. Thus, it is possible to obtain the advantage that disorder rarely occurs in an image received by the reception device.

Also, FIG. 4 illustrates the example in which the communication system 1000 includes two transmission devices, the transmission devices 300A and 300B. However, the invention is not limited to the example and the number of transmission devices included in the communication system according to the present disclosure may be, for example, 3 or more.

(Reception Device)

The reception device 400 is a device that receives image data. For example, the reception device 400 according to the embodiment receives the image data from the transmission device 300A or 300B via the network switch 200. The image data received by the reception device 400 is switched through manipulation control of the communication control device 100, the network switch 200, the controller 600, the network manager 700, or the like.

Also, FIG. 4 illustrates the example in which the communication system 1000 includes one reception device (the reception device 400), but the present disclosure is not limited to the example. The number of reception devices included in the communication system according to the present disclosure may be plural.

(Synchronization Signal Generation Device)

The synchronization signal generation device 500 generates a synchronization signal and transmits the synchronization signal to, for example, the communication control device 100 and the transmission devices 300A and 300B. When the same synchronization signal is transmitted to the device, the communication control device 100 can specify the value of the flag added to the image data or a timing of the boundary of the predetermined unit in regard to the image data without receiving the currently transmitted image data.

The synchronization signal transmitted by the synchronization signal generation device 500 according to the embodiment may include information regarding a time stamp indicating a time or may be, for example, a synchronization signal using a time synchronization protocol such as the precision time protocol (PTP). FIGS. 6 to 8 are explanatory diagrams illustrating an example of the synchronization signal transmitted by the synchronization signal generation device 500 according to the embodiment.

As illustrated in FIG. 6, the synchronization signal according to the embodiment may include a common message header, a body, and a suffix. For example, the common message header has a size of 34 octets, as illustrated in FIG. 6 and may include various kinds of information illustrated in FIG. 7. In addition, the body may be, for example, a time stamp indicating a time and may include, for example, secondsField with 48 bits indicating seconds and nanosecondsField with 32 bits indicating nanoseconds, as illustrated in FIG. 8. In addition, a suffix added to the end of the synchronization signal may have a length of 0 (that is, a suffix is not added), as illustrated in FIG. 6.

In accordance with the foregoing synchronization signal, for example, the communication control device 100 and the transmission devices 300A and 300B can share the same rule for specifying the value of the flag from the time stamp, and thus each device can specify a flag to be added to the image data.

(Controller)

The controller 600 receives a user input regarding switching of an image. An image switching request input at the time of manipulation of the controller 600 by the user is transmitted to the communication control device 100 via the network manager 700.

(Network Manager)

Referring back to FIG. 4 to make the description, the network manager 700 transmits various requests related to communication to the communication control device. For example, the network manager 700 transmits an image switching request input at the time of manipulation of the controller 600 by the user to the communication control device 100.

The example of the configuration of the communication system 1000 according to the embodiment has been described above. Next, examples of the configurations of the communication control device 100 and the network switch 200 included in the communication system 1000 according to the embodiment will be described in detail in order with reference to FIG. 9.

2-2. Configuration of Communication Control Device

Figure 9:
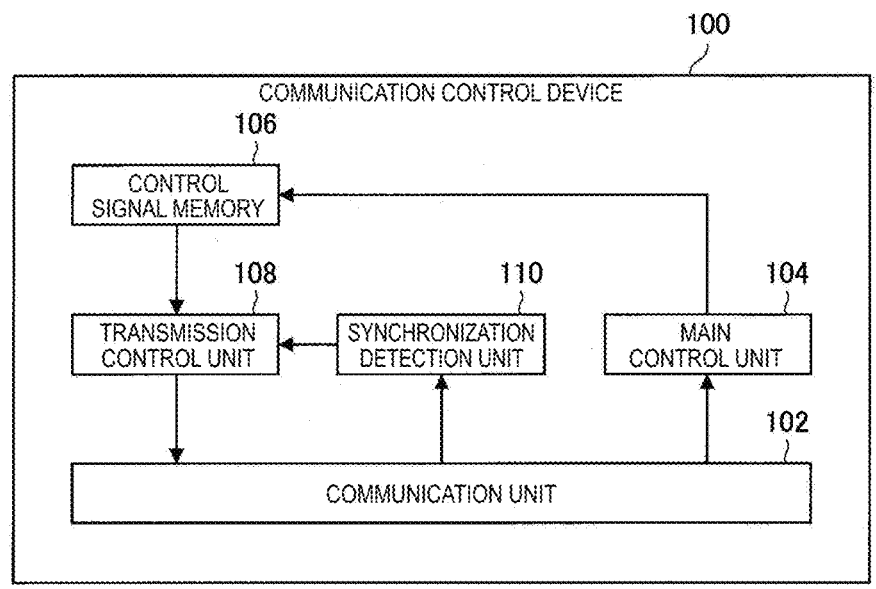
FIG. 9 is an explanatory diagram illustrating an example of a configuration of a communication control device according to the embodiment.

FIG. 9 is an explanatory diagram illustrating an example of the configuration of the communication control device 100 according to the embodiment. As illustrated in FIG. 9, the communication control device 100 includes a communication unit 102, a main control unit 104, a control signal memory 106, a transmission control unit 108, and a synchronization detection unit 110.

(Communication Unit)

The communication unit 102 is communication means included in the communication control device 100 and is controlled by, for example, the transmission control unit 108 such that a control signal is transmitted to the network switch 200 at a timing in accordance with the synchronization timing. In addition, the communication unit 102 receives the synchronization signal transmitted by the synchronization signal generation device 500 and supplies the synchronization signal to the synchronization detection unit 110. In addition, the communication unit 102 receives an image switching request transmitted by the network manager 700 and supplies the image switching request to the main control unit 104.

For example, a local area network (LAN) terminal, a transmission and reception circuit (wired communication), or an IEEE 802.11 port and a transmission and reception circuit (wireless communication) may be used as the communication unit 102. In addition, the communication unit 102 may be a communication device corresponding to a network. Examples of the network according to the embodiment include a wired network such as a LAN or wide area network (WAN), a wireless network such as a wireless local area network (WLAN) or wireless wide area network (WWAN) via a base station, and the Internet in which a communication protocol such as Transmission Control Protocol/Internet Protocol (TCP/IP) is used.

(Main Control Unit)

For example, the main control unit 104 converts the image switching request received from the communication unit 102 into a control signal for changing a communication route of the image data and registers the control signal in a control signal queue stored in the control signal memory 106. The control signal may be, for example, a flow control request corresponding to a flow used for route control by the network switch 200 and may include information regarding a transmission source or information (including whether the information is transferred) regarding a transfer destination.

In addition, the main control unit 104 may control the entire communication control device 100 and may have, for example, a function of the transmission control unit 108, the synchronization detection unit 110, or the like to be described below.

(Control Signal Memory)

The control signal memory 106 is a unit that stores the control signal queue. The control signal memory 106 may be, for example, a random access memory (RAM) or a storage device. The control signal queue stored by the control signal memory 106 retains the control signal registered by the main control unit 104 as a data structure of a queue (waiting line). The control signal registered in the control signal queue is extracted by the transmission control unit 108 in a registration order. Also, the extracted control signal is deleted from the control signal queue.

(Transmission Control Unit)

The transmission control unit 108 receives information regarding the time stamp included in the synchronization timing or the synchronization signal from the synchronization detection unit 110 and controls transmission of the control signal by the communication unit 102. For example, the transmission control unit 108 causes the communication unit 102 to transmit the control signal for changing the communication route of the data to which the flag specified on the basis of the synchronization signal is added, to the network switch 200 at a timing in accordance with the synchronization timing detected by the synchronization detection unit 110.

For example, the transmission control unit 108 may extract the control signal including the information regarding the transmission source and the information regarding the transfer destination from the control signal queue stored in the control signal memory 106 and may set a flag-added control signal in which information of the flag is added to the control signal as a control signal to be transmitted by the communication unit 102. In addition, the control signal is transmitted as a flow control request to the network switch 200, and the network switch 200 receiving the control signal changes a communication route so that communication matching a condition of a combination of the transmission source and the flag is transferred to the transfer destination. In addition, the transmission control unit 108 may specify the flag added to the data for which the communication path is to be changed using the information regarding the time stamp included in the synchronization signal. For example, the transmission control unit 108 may specify the flag added to the image data transmitted immediately before the synchronization timing detected from the synchronization signal using the information regarding the time stamp and set the flag as the flag added to the control signal. In the configuration, it is possible to prevent a change in the communication route midway in the field (the predetermined unit) in the image data transmitted immediately after the synchronization timing. In addition, in accordance with the foregoing change in the communication route, bandwidth consumption at the time of switching of an image received by the reception device 400 is the same as that in a case in which the image is not switched and it is possible to suppress the bandwidth consumption at the time of switching of an image.

In addition, the transmission control unit 108 may cause the communication unit 102 to transmit the control signal at the synchronization timing and a timing in accordance with a time taken from transmission of the control signal by the transmission control unit 108 to reflection of the change in the communication route by the control signal in the network switch 200. For example, the transmission timing of the control signal may be set so that the reflection of the change in the communication path by the control signal starts after the synchronization timing and is completed before a subsequent synchronization timing of the synchronization timing. For example, in a case in which the time taken until completion of the reflection of the change is less than a synchronization interval, the control signal may be transmitted at a timing after the synchronization timing by a time less than a difference between the time and the synchronization interval. In addition, the control signal may be transmitted at a timing before the synchronization timing by a time less than a time taken from transmission of the control signal by the transmission control unit 108 to start of the reflection of the change. Also, in a case in which the control signal is transmitted before the synchronization timing, the transmission control unit 108 may set a transmission timing on the basis of the synchronization timing immediately before the synchronization timing and the synchronization interval. Also, an example in which the control signal is transmitted at the same timing as the synchronization timing by the transmission control unit 108 will be described below.

In addition, the transmission control unit 108 may cause the communication unit 102 to transmit the control signal twice for one communication route change (switching of an image). For example, the transmission control unit 108 may cause the communication unit 102 to transmit the flag-added control signal in which each flag of 0 and 1 is added to one control signal registered in the control signal queue once. In addition, the control signal transmitted once may be a two-flow control request for a flow regarding a transmission source of image data currently received by the reception device 400 and a flow regarding a transmission source of image data received after the route change by the reception device 400. In the configuration, the number of updates (to be described below) of a flow table by the network switch 200 for one communication route change is fixed to 4 times irrespective of the number of transmission devices or reception devices, and there is the advantage that a processing time of the process is unlikely to increase. Also, for example, as will be described below in modification examples, in a case in which 3 or more kinds of values are sequentially added to the image data instead of the binary (0 and 1) flag, the control signal may be transmitted 3 or more times for one route change.

(Synchronization Detection Unit)

The synchronization detection unit 110 detects the synchronization timing from the synchronization signal received from the communication unit 102 and supplies the synchronization timing and the information regarding the time stamp included in the synchronization signal to the transmission control unit 108.

2-3. Configuration of Network Switch

Figure 10:
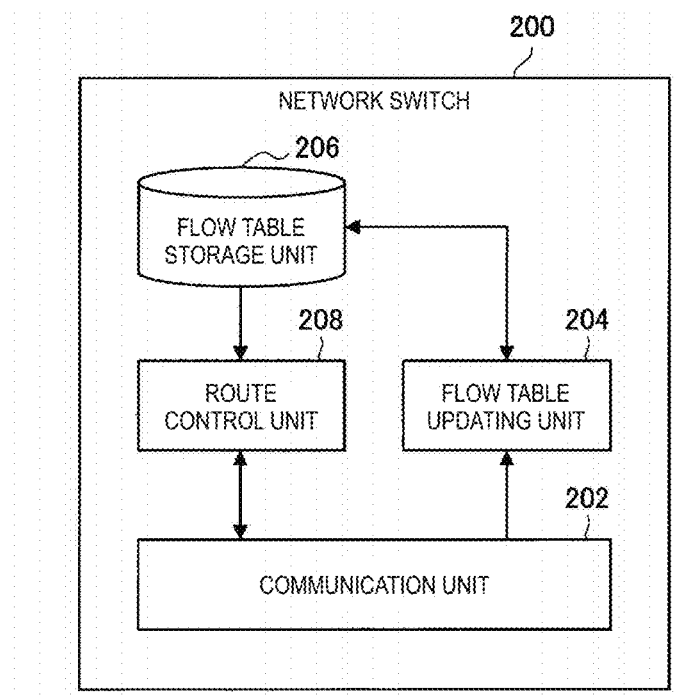
FIG. 10 is an explanatory diagram illustrating an example of a configuration of a network switch according to the embodiment.

FIG. 10 is an explanatory diagram illustrating an example of a configuration of the network switch 200 according to the embodiment. As illustrated in FIG. 10, the network switch 200 includes a communication unit 202, a flow table updating unit 204, a flow table storage unit 206, and a route control unit 208.

(Communication Unit)

The communication unit 202 is communication means included in the network switch 200 and receives, for example, image data from the transmission devices 300A and 300B. In addition, the communication unit 202 is controlled by the route control unit 208 and performs relay between the transmission devices 300A and 300B and the reception device 400 by transmitting the image data matching a condition to be described in the image data to the reception device 400. In addition, the communication unit 202 has a function of a reception unit that receives the control signal transmitted by the communication control device 100 and supplies the control signal to the flow table updating unit.

As the communication unit 202, for example, a local area network (LAN) terminal, a transmission and reception circuit (wired communication), or an IEEE 802.11 port and a transmission and reception circuit (wireless communication) may be used as the communication unit 102. In addition, the communication unit 202 may be a communication device corresponding to a network according to the embodiment.

(Flow Table Updating Unit)

The flow table updating unit 204 updates the flow table in which a condition and a route control process are associated on the basis of the control signal received by the communication unit 202. The flow table may be a table in which a flow in which a condition, an action (a route control process), and statistical information are associated is arranged and is stored in the flow table storage unit 206 to be described below. As described above, the control signal may be a flow control request including information regarding a transmission source, a flag, and information regarding a transfer destination. Here, for example, the flow table updating unit 204 sets a combination of the transmission source and the flag as a condition and adds a flow in which transmission to the transfer destination (or that there is no transfer destination) is set as an action to the flow table. In addition, in a case in which the flow in which the transmission source has already been included as the condition is included in the flow table, the flow table updating unit 204 may update the flag of the flow and the information regarding the transfer destination to the flag and the information regarding the transfer destination included in the flow control request.

(Flow Table Storage Unit)

The flow table storage unit 206 stores a flow table in which a condition and a route control process are associated (a table in which a flow is arranged). The flow table storage unit 206 may be, for example, an associative memory such as a ternary content addressable memory (TCAM).

(Route Control Unit)

The route control unit 208 controls relay between the transmission devices 300A and 300B and the reception device 400 on the basis of the flow table stored in the flow table storage unit 206. For example, in a case in which a received packet (for example, image data) is matched to a condition (a set of the transmission source and the flag) of the flow included in the flow table, the route control unit 208 causes the communication unit 202 to transmit the packet on the basis of the action of the flow (for example, the information regarding the transfer destination). For example, in a case in which an action of not transferring (destroying) the packet is included in the flow, the route control unit 208 destroys the packet. In addition, in a case in which an action of transferring the packet to the reception device 400 is included in the flow, the route control unit 208 causes the communication unit 202 to transmit the packet to the reception device 400.

As described above, the flag is added to the image data so that the flag is switched for each predetermined unit in regard to the image data. Therefore, as described above, the route control unit 208 changes the communication route (switches the image) for each predetermined unit by controlling the relay. For example, in a case in which the predetermined units are units of one field, as described above, the image is switched in units of one field without switching the image in the midway portion of one field. Thus, it is possible to obtain the advantage that disorder rarely occurs in an image received by the reception device.

3. Operation

Figure 11:
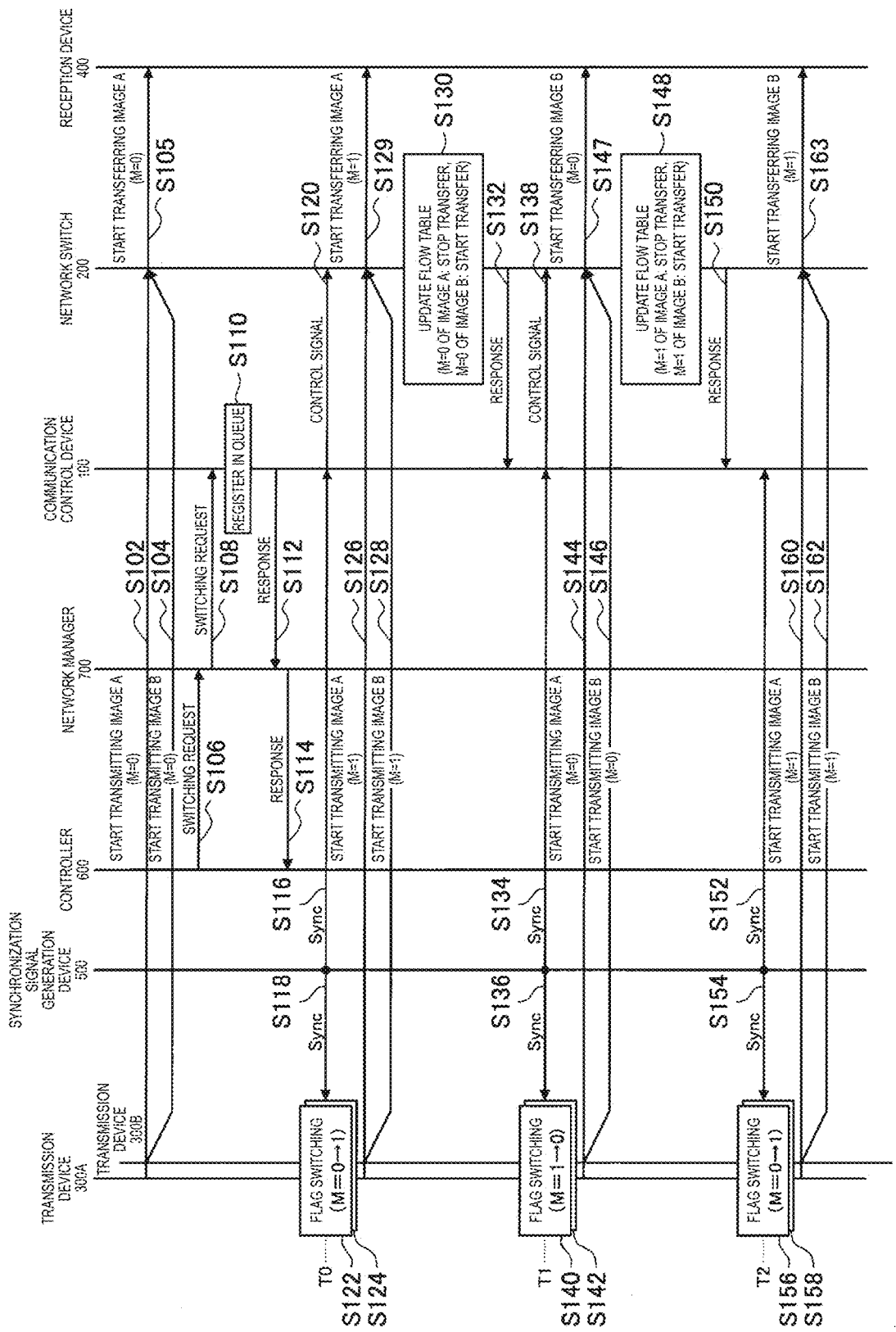
FIG. 11 is an explanatory diagram illustrating an example of a communication control process in the communication system according to the embodiment.
Figure 12:
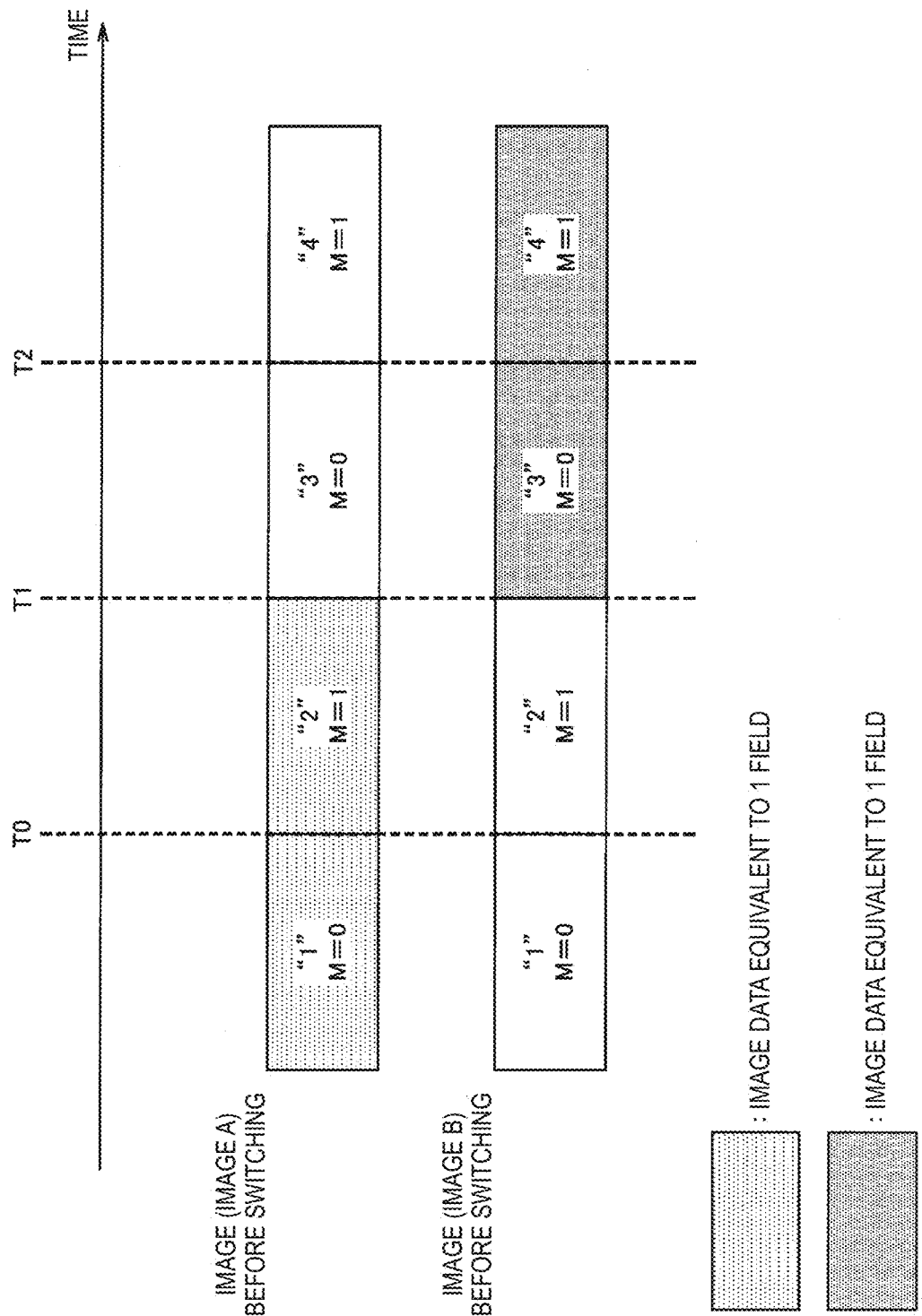
FIG. 12 is an explanatory diagram illustrating an example of a communication control process in the communication system according to the embodiment.

The example of the configuration of the communication system 1000 according to the embodiment of the present disclosure has been described above. Next, an example of an operation of the communication system 1000 according to the embodiment will be described with reference to FIGS. 11 to 13. FIGS. 11 to 13 are explanatory diagrams illustrating an example of a communication control process in the communication system 1000 according to the embodiment. Hereinafter, while an operation example of the entire communication system 1000 according to the embodiment is described with reference to FIG. 11, switching of the image in the operation example and updating of the flow table in the operation example will be described with reference to FIGS. 12 and 13, respectively.

Hereinafter, an image before switching is referred to as an "image A" and an image after switching is referred to as an "image B." An operation of a case in which the communication system 1000 according to the embodiment switches an image to be received by the reception device 400 from the image A to the image B will be described. In addition, the image A is image data transmitted by the transmission device 300A and the image B is image data transmitted by the transmission device 300B. Also, the communication system 1000 according to the embodiment can switch an image to be received by the reception device 400 from one image to another image through a process related to the switching of the image to be described below.

As illustrated in FIGS. 11 and 12, first, the transmission devices 300A and 300B start transmitting image data to which flag M=0 is added to the network switch 200 (S102 and S104 in FIG. 11). Here, as illustrated in the upper stage of FIG. 13, a packet of the transmission device 300A which is the transmission source is transmitted to the reception device 400 and a packet of the transmission device 300B which is the transmission source is not transmitted but destroyed irrespective of the value of the flag in the flow table before time T0. In addition, as illustrated in FIG. 11, the network switch 200 receiving the image A (the flag M=0) and the image B (the flag M=0) starts transmission of the image A (the flag M=0) to the reception device 400 (S105) and destroys the image B (the flag M=0) in accordance with the flow table.

Subsequently, the controller 600 receives a user manipulation and transmits an image switching request input by the user to the network manager 700 (S106). The network manager 700 receiving the image switching request transmits the image switching request to the communication control device 100 (S108). In the operation example, the switching request for switching the image to be received by the reception device 400 from the image A to the image B is transmitted and received.

Subsequently, the communication control device 100 converts the switching request for the received image into a control signal (flow control request) and registers the control signal in a control signal queue (S110). In the operation example, the above-described switching request is converted into the flow control request regarding each of the transmission devices 300A and 300B. For example, the switching request is converted into the flow control request for "destroying (stopping transmission of) the packet (the image data) in the case in which the transmission source is the transmission device 300" and "transmitting the packet to the reception device 400 in a case in which the transmission source is the transmission device 300B."

When the control signal is registered in the control signal queue, a response indicating that the process is performed normally is transmitted from the communication control device 100 to the network manager 700 (S112). Subsequently, a response is similarly transmitted from the network manager 700 to the controller 600 (S114).

As illustrated in FIG. 11, a periodically transmitted Syn message (synchronization signal) is transmitted from the synchronization signal generation device 500 to the communication control device 100 and the transmission devices 300A and 300B at time T0 (S116 and S118). Here, the communication control device 100 reads the control signal registered in the control signal queue simultaneously with the synchronization timing detected from the synchronization signal and transmits a control signal obtained by adding the condition regarding the flag M to the control signal to the network switch 200 (S120). Here, as described above, the flag M is the same as the flag added to the image data transmitted immediately before the synchronization timing and the flag M=0 is specified in step S120 of the operation example.

In addition, the transmission devices 300A and 300B switch (change) the flag added to the image data to be transmitted simultaneously with the synchronization timing detected from the synchronization signal (S122 and S124). That is, the transmission devices 300A and 300B add the flag M=0 to the image data before the synchronization timing and add the flag M=1 to the image data after the synchronization timing to transmit the image data (S126 and S128). Accordingly, as illustrated in FIG. 12, the flags added to the images A and B are different before and after time T0 which is the synchronization timing. In addition, as illustrated in FIG. 11, the network switch 200 receiving the image A (the flag M=1) and the image B (the flag M=1) starts transferring the image A (the flag M=1) to the reception device 400 in accordance with the flow table (S129) and destroys the image B (the flag M=1).

The network switch 200 receiving the control signal transmitted at time T0 updates the flow table as in a flow table illustrated in the middle stage of FIG. 13 in accordance with the control signal (S130 in FIG. 11). Here, the flag added to the image data which is being transmitted from the transmission devices 300A and 300B is the flag M=1. On the other hand, since the condition regarding the flag included in the control signal is the flag M=0, as described above, the transfer destination in the case of the flag M=1 is not changed before and after the updating. Accordingly, until a subsequent flag switching process is performed (that is, a subsequent field), the image to be received by the reception device 400 is not switched.

Subsequently, as illustrated in FIG. 11, when the network switch 200 completes the updating of the flow table, a response indicating that the process is performed normally is transmitted from the network switch 200 to the communication control device 100 (S132).

Subsequently, at time T1, the Syn message (synchronization signal) is retransmitted from the synchronization signal generation device 500 to the communication control device 100 and the transmission devices 300A and 300B (S134 and S136). Here, the communication control device 100 transmits a control signal obtained by adding the condition regarding the flag M to the control signal read in step S120 to the network switch 200 simultaneously with the synchronization timing detected from the synchronization signal and (S138). Here, as described above, the flag M is the same as the flag added to the image data transmitted immediately before the synchronization timing and the flag M=1 is specified in step S138 of the operation example.

In addition, the transmission devices 300A and 300B switch (change) the flag added to the image data to be transmitted simultaneously with the synchronization timing detected from the synchronization signal (S140 and S142). That is, the transmission devices 300A and 300B add the flag M=1 to the image data before the synchronization timing and add the flag M=0 to the image data after the synchronization timing to transmit the image data (S144 and S146). Accordingly, as illustrated in FIG. 12, the flags added to the images A and B are different before and after time T1 which is the synchronization timing.

Here, in accordance with the flow table (the middle stage of FIG. 13) updated in step S130, the packet of the flag M=0 is destroyed by the transmission source 300A and the packet of the flag M=0 is transferred to the reception device 400 by the transmission source 300B. That is, as illustrated in FIG. 11, the network switch 200 receiving the image A (the flag M=0) and the image B (the flag M=0) destroys the image A (the flag M=0) and transfers the image A (the flag M=0) to the reception device 400 in accordance with the flow table (S147). Accordingly, as illustrated in FIG. 12, the image to be received by the reception device 400 is switched from the image A to the image B before and after time T1.

The network switch 200 receiving the control signal transmitted at time T1 updates the flow table as in a flow table illustrated in the lower stage of FIG. 13 in accordance with the control signal (S148 in FIG. 11).

Subsequently, as illustrated in FIG. 11, when the network switch 200 completes the updating of the flow table, a response indicating that the process is performed normally is transmitted from the network switch 200 to the communication control device 100 (S150).

Subsequently, at time T2, the Syn message (synchronization signal) is retransmitted from the synchronization signal generation device 500 to the communication control device 100 and the transmission devices 300A and 300B (S152 and S154). In the operation example, since no control signal remains in the control signal queue at this time point, the communication control device 100 does not perform the process corresponding to the synchronization signal.

In addition, the transmission devices 300A and 300B switch (change) the flag added to the image data to be transmitted simultaneously with the synchronization timing detected from the synchronization signal (S156 and S158). That is, the transmission devices 300A and 300B add the flag M=0 to the image data before the synchronization timing and add the flag M=1 to the image data after the synchronization timing to transmit the image data (S160 and S162). Accordingly, as illustrated in FIG. 12, the flags added to the images A and B are different before and after time T2 which is the synchronization timing.

Here, in accordance with the flow table (the lower stage of FIG. 13) updated in step S130, the packet of the flag M=1 is destroyed by the transmission source 300A and the packet of the flag M=1 is transferred to the reception device 400 by the transmission source 300B. That is, as illustrated in FIG. 11, the network switch 200 receiving the image A (the flag M=1) and the image B (the flag M=1) destroys the image A (the flag M=1) and transfers the image A (the flag M=1) to the reception device 400 in accordance with the flow table (S163).

Through the process from steps S102 to S163 illustrated in FIG. 11 described above, as illustrated in FIG. 12, the image data received by the reception device 400 is switched from the image A to the image B at time T1 which is the synchronization timing and is also a field boundary. Since the image is switched in the field boundary, disorder rarely occurs in the image received by the reception device 400. In addition, since the image data received by the reception device 400 is usually one stream for a period of the switching process from steps S102 to S163 illustrated in FIG. 11, unnecessary bandwidth consumption rarely occurs, and thus it is possible to suppress the bandwidth consumption.

4. Modification Examples

The embodiment of the present disclosure has been described above. Hereinafter, several modification examples of the embodiment will be described. Also, the modification examples to be described below may be applied solely to the embodiment or may be applied in combination to the embodiment. In addition, each modification example may be applied instead of the configuration described in the embodiment or may be applied in addition to the configuration described in the embodiment.

4-1. Modification Example 1

The example in which the predetermined units (that is, the change interval of the flag) in the image data synchronized with the synchronization are units of one field has been described above, but the present technology is not limited to the foregoing example. The predetermined units in the image data may be, for example, units of one frame, units of a plurality of fields, or units of a plurality of frames.

For example, the predetermined units in the image data may be set in accordance with a time taken from transmission of the control signal by the transmission control unit 108 of the communication control device 100 to reflection of a change in the communication route in accordance with the control signal in the network switch 200 (a time necessary for the reflection).

In the embodiment, in a case in which the flag change interval (a transmission start interval of the predetermined unit in the image data) is shorter than the time necessary for the reflection, an image to be received by the reception device 400 is switched in the midway portion of the predetermined unit in the image data, and thus there is a concern of disorder of the image occurring. Accordingly, in the embodiment, the transmission start interval of the predetermined unit in the image data is preferably greater than the time necessary for the reflection.

However, as the predetermined units in the image data are larger, a time necessary from transmission of an image switching request and actual switching of the image to be received is longer. Accordingly, for example, the predetermined units in the image data according to the embodiment are preferably set so that the transmission start interval of the predetermined units in the image data is longer than the time necessary in the reflection and is as small as possible.

In the configuration, even in a case in which the time necessary for the reflection of the communication route change is large, it is possible to prevent disorder from occurring in the image to be received by the reception device 400.

4-2. Modification Example 2

The example in which the values 0 and 1 of the flag added to the image data are alternately repeated for each predetermined unit in the image data has been described above, but the present technology is not limited to the foregoing example. For example, 3 or more values may be added sequentially to the image data. When more kinds of values are used as values to be added, a time necessary from transmission of the image switching request to the actual switching of the image to be received can be delayed as in a case in which the predetermined units in the image data in Modification Example 1 are set to be large. Accordingly, in the configuration, it is possible to prevent disorder from occurring in the image to be received by the reception device 400 even when the time necessary for the reflection of the communication route change is large.

5. Example of Hardware Configuration

The embodiment and the modification examples of the present disclosure have been described above. Information processing for the registration in the control signal queue and the transmission control of the control signal, as described above, is realized in cooperation of software and hardware of the communication control device 100 to be described below.

Figure 14:
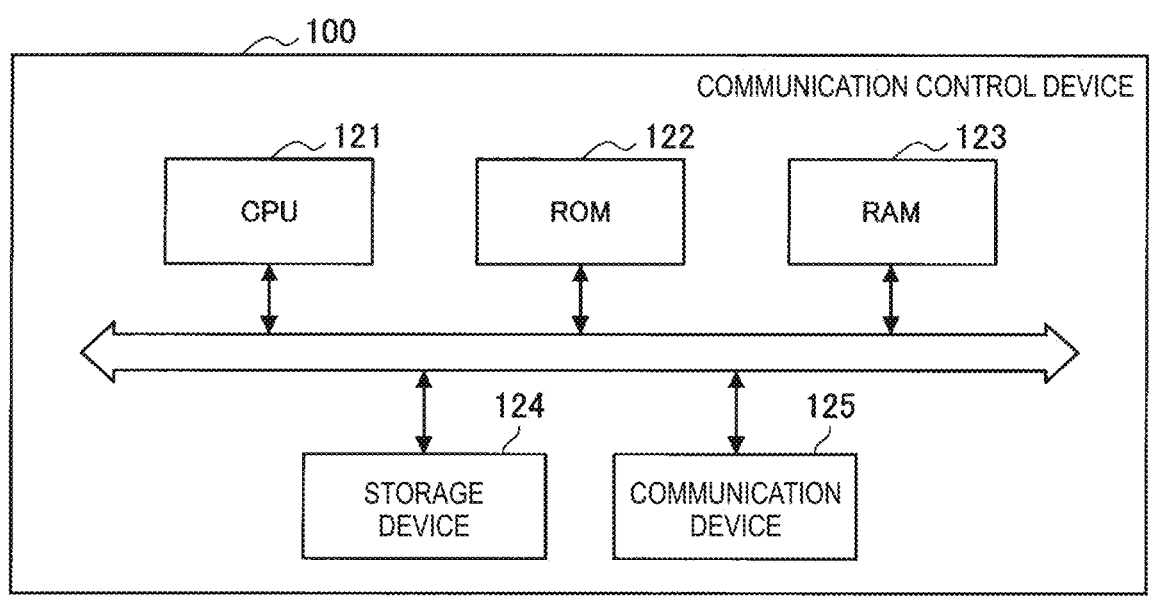
FIG. 14 is an explanatory diagram illustrating an example of a hardware configuration of a communication control device 100 according to the embodiment.

FIG. 14 is an explanatory diagram illustrating a hardware configuration of a communication control device 100. As illustrated in FIG. 14, the communication control device 100 includes a central processing unit (CPU) 121, a read-only memory (ROM) 122, a random access memory (RAM) 123, a storage device 124, and a communication device 125.

The CPU 121 functions as an arithmetic processing device and a control device and controls an overall operation in the communication control device 100 in accordance with various programs. In addition, the CPU 121 may be a microprocessor. The ROM 122 stores a program, arithmetic parameters, or the like which are used by the CPU 121. The RAM 123 temporarily stores a program which is used in execution of the CPU 121 or parameters or the like which are appropriately changed in the execution. The CPU, the ROM, and the RAM are connected by a host bus configured with a CPU bus or the like. The functions of the main control unit 104, the control signal memory 106, the transmission control unit 108, and the synchronization detection unit 110 are realized mainly by cooperation of the CPU 121, the ROM 122, the RAM 123, and software.

The storage device 124 is a data storage device. The storage device 124 may include a storage medium, a recording device that records data on the storage medium, a reading device that reads data from the storage medium, and a deletion device that deletes the data recorded on the storage medium. The storage device 124 stores various kinds of data and a program which is executed by the CPU 121.

The communication device 125 is, for example, a communication interface configured with a communication device or the like connected to a communication network. In addition, the communication device 125 may include a communication device corresponding to a wireless local area network (LAN), a communication device corresponding to Long Term Evolution (LTE), a wire communication device that performs wired communication, or a Bluetooth communication device. The communication device 125 corresponds to the communication unit 102 described with reference to FIG. 9.

Also, the hardware configuration of the communication control device 100 has been described above, but the network switch 200 also has hardware corresponding to the CPU 121, the ROM 122, and the RAM 123 as in the communication control device 100. Thus, for example, a function of the flow table updating unit 204 is realized by cooperation of hardware and software of the network switch 200.

6. Conclusion

As described above, according to an embodiment of the present disclosure, it is possible to prevent degradation of image quality and disorder in an image to be received in switching of image data and it is possible to suppress the bandwidth consumption. Compared to the switching procedure described with reference to FIGS. 2A, 2B and 2C and 3, in the embodiment of the present disclosure, bandwidth consumption at the time of switching of the image data to be transmitted is half. When the same bandwidth is used, the number of receivable images can be doubled.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the image data transmitted from one of two transmission devices is transferred to one reception device has been described in the foregoing embodiment, but the present technology is not limited to the example. For example, the present technology may be applied to a communication system that includes more transmission devices or more reception devices or the image data transmitted by one transmission device may be transferred to a plurality of reception devices.

In addition, the example in which the image switching request is performed on the basis of a manipulation on the controller by the user has been described in the foregoing embodiment, but the present technology is not limited to the example. For example, the switching request may be generated on the basis of a preset time by an external device or any device included in the communication system according to the present technology. In addition, the switching request may be generated on the basis of a result of image processing in an external device or any device included in the communication system according to the present technology. Here, as an example of the generation of the switching request based on the result of the image processing, for example, "generation of a switching request for switching to an image in which a ball is shown in regard to an image in which a baseball game is displayed" can be exemplified.

In addition, the example in which the transmission control unit 108 specifies the flag on the basis of the synchronization signal and the main control unit 104 adds the condition regarding the flag to the control signal registered in the control signal queue has been described in the foregoing embodiment, but the present technology is not limited to the example. For example, the main control unit 104 may specify the flag on the basis of the synchronization signal and register the control signal including the condition regarding the flag in the control signal queue.

In addition, according to the embodiment, a computer program causing hardware such as the CPU 101, the ROM 102, and the RAM 103 to function as in each configuration of the communication control device 100 described above can also be supplied. In addition, a recording medium on which the computer program is recorded is also supplied.

In addition, the steps in the foregoing embodiment may not necessarily be processed chronologically in the order described in the sequence diagram. For example, the steps in the process of the foregoing embodiment may be processed in an order different from the order described in the sequence diagram or may be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control device including:

a synchronization detection unit configured to detect a synchronization timing from a synchronization signal; and a transmission control unit configured to cause a communication unit to transmit a control signal for changing a communication route of data to which a flag specified on the basis of the synchronization signal is added, to a network switch performing relay between a reception device and a plurality of transmission devices transmitting the data to which the flag is added while changing the flag at the synchronization timing, at a timing corresponding to the synchronization timing.

(2)

The communication control device according to (1), in which the transmission control unit causes the control signal to be transmitted at the synchronization timing and a timing corresponding to a time taken from transmission of the control signal by the transmission control unit to reflection of the change in the communication route by the control signal in the network switch.

(3)

The communication control device according to (1) or (2), in which the data is image data and the synchronization timing is in synchronization with a predetermined unit in regard to the image data.

(4)

The communication control device according to (3), in which the predetermined unit in regard to the image data is set in accordance with a time taken from transmission of the control signal by the transmission control unit to reflection of the change in the communication route by the control signal in the network switch.

(5)

The communication control device according to any one of (1) to (4), in which the transmission control unit causes the control signal to be transmitted twice to change one communication route.

(6)

A communication control method including:

detecting a synchronization timing from a synchronization signal; and causing a processor to transmit a control signal for changing a communication route of data to which a flag specified on the basis of the synchronization signal is added, to a network switch performing relay between a reception device and a plurality of transmission devices transmitting the data to which the flag is added while changing the flag at the synchronization timing on the basis of the control signal, at a timing corresponding to the synchronization timing.

(7)

A network switch including:

a reception unit configured to receive a control signal for changing a communication route of data to which a flag specified on the basis of a synchronization signal is added and which is transmitted at a timing corresponding to a synchronization timing detected from the synchronization signal; and a route control unit configured to control relay between a reception device and a plurality of transmission devices transmitting the data to which the flag is added while changing the flag at the synchronization timing.

(8)

The network switch according to (7), further including:

a flow table updating unit configured to update a flow table in which a condition and a route control process are associated, on the basis of the received control signal, in which the route control unit controls the relay on the basis of the flow table.

(9)

A route control method including:

receiving a control signal for changing a communication route of data to which a flag specified on the basis of a synchronization signal is added and which is transmitted at a timing corresponding to a synchronization timing detected from the synchronization signal; and performing, by a processor, on the basis of the control signal, relay between a reception device and a plurality of transmission devices transmitting the data to which the flag is added while changing the flag at the synchronization timing.

(10)

A communication system including:
  transmission devices configured to transmit data to which a flag is added while changing the flag at a synchronization timing detected from a synchronization signal;
  a network switch configured to include
  a reception unit configured to receive a control signal, and
  a route control unit configured to control relay between a reception device and the plurality of transmission devices; and
  a communication control device configured to include
  a synchronization detection unit configured to detect the synchronization timing from the synchronization signal, and
  a transmission control unit configured to cause a communication unit to transmit the control signal for changing a communication route of the data to which the flag specified on the basis of the synchronization signal is added, to the network switch at a timing corresponding to the synchronization timing.

REFERENCE SIGNS LIST 100 communication control device
102 communication unit
104 main control unit
106 control signal memory
108 transmission control unit
110 synchronization detection unit
200 network switch
202 communication unit
204 flow table updating unit
206 flow table storage unit
208 route control unit
300A, 300B transmission device
400 reception device
500 synchronization signal generation device
600 controller
700 network manager
1000 communication system

The invention claimed is:

1. A network switch, comprising:
  a reception unit configured to receive a first control signal which is transmitted at a timing corresponding to a synchronization timing, wherein
    the synchronization timing is detected from a synchronization signal,
    the first control signal causes a change in a communication route of data to which a flag is added, and
    the flag is specified based on the synchronization signal; and
  a route control unit configured to control relay between a reception device and a plurality of transmission devices that transmits the data to which the flag is added.

2. The network switch according to claim 1, further comprising
  a flow table updating unit configured to update a flow table in which a condition and a route control process are associated, wherein
    the flow table is updated based on the received first control signal, and
    the route control unit is further configured to control the relay based on the flow table.

3. The network switch according to claim 2, wherein
  the first control signal includes information regarding a transmission source, the flag, and information regarding a transfer destination.

4. The network switch according to claim 3, wherein the flow table updating unit is further configured to:
  set a combination of the transmission source and the flag as the condition; and
  add a flow in which transmission to the transfer destination is set as an action to the flow table.

5. The network switch according to claim 1, wherein
  the reception unit is further configured to receive a second control signal at a timing corresponding to a time taken from the transmission of the first control signal to completion of the change in the communication route by the first control signal in the network switch.

6. The network switch according to claim 1, wherein
  the data is image data, and
  the synchronization timing is in synchronization with a specific unit in regard to the image data.

7. The network switch according to claim 6, wherein
  the specific unit in regard to the image data is set based on a time taken from the transmission of the first control signal to completion of the change in the communication route by the first control signal in the network switch.

8. The network switch according to claim 1, wherein
  the reception unit is further configured to receive the first control signal twice to change the communication route.

9. A route control method, comprising:
  in a network switch:
  receiving a first control signal which is transmitted at a timing corresponding to a synchronization timing, wherein
    the synchronization timing is detected from a synchronization signal,
    the first control signal causes a change in a communication route of data to which a flag is added, and
    the flag is specified based on the synchronization signal; and
  controlling relay between a reception device and a plurality of transmission devices that transmits the data to which the flag is added.

10. The route control method according to claim 9, further comprising
  updating a flow table in which a condition and a route control process are associated, wherein
    the flow table is updated based on the received first control signal; and
  controlling the relay based on the flow table.

11. The route control method according to claim 10, wherein
  the first control signal includes information regarding a transmission source, the flag, and information regarding a transfer destination.

12. The route control method according to claim 11, further comprising:
  setting a combination of the transmission source and the flag as the condition; and
  adding a flow in which transmission to the transfer destination is set as an action to the flow table.

13. The route control method according to claim 9, further comprising receiving a second control signal at a timing corresponding to a time taken from the transmission of the first control signal to completion of the change in the communication route by the first control signal in the network switch.

14. The route control method according to claim 9, wherein
the data is image data, and
the synchronization timing is in synchronization with a specific unit in regard to the image data.

15. The route control method according to claim 14, wherein
the specific unit in regard to the image data is set based on a time taken from the transmission of the first control signal to completion of the change in the communication route by the first control signal in the network switch.

16. The route control method according to claim 9, further comprising receiving the first control signal twice to change the communication route.

17. The route control method according to claim 9, wherein the flag is changed at the synchronization timing.

* * * * *